United States Patent
Kim et al.

(10) Patent No.: US 7,869,313 B2
(45) Date of Patent: Jan. 11, 2011

(54) OPTICAL PICKUP ACTUATOR

(75) Inventors: Seok-juno Kim, Suwon-si (KR); Moon-hwan Lee, Yongin-si (KR); Jung-gug Pae, Suwon-si (KR); Jong-uk Kim, Yongin-si (KR); Jung-chan Moon, Busan Metropolitan (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 970 days.

(21) Appl. No.: 11/593,573

(22) Filed: Nov. 7, 2006

(65) Prior Publication Data
US 2007/0104044 A1    May 10, 2007

(30) Foreign Application Priority Data
Nov. 9, 2005    (KR) .................... 10-2005-0107004

(51) Int. Cl.
 *G11B 7/00*    (2006.01)
(52) U.S. Cl. ................. 369/44.14; 369/44.22; 369/253
(58) Field of Classification Search .............. 369/44.15, 369/44.22, 253
See application file for complete search history.

(56) References Cited

U.S. PATENT DOCUMENTS

| 6,134,058 | A  | * | 10/2000 | Mohri et al. ............... 359/824 |
| 6,747,921 | B2 | * | 6/2004  | Wakabayashi et al. ... 369/44.16 |
| 7,324,412 | B2 | * | 1/2008  | Im et al. .................. 369/44.15 |
| 7,489,600 | B2 | * | 2/2009  | Akanuma ................ 369/44.11 |
| 2001/0048657 | A1 | * | 12/2001 | Ohtsuka .................... 369/244 |
| 2003/0156529 | A1 | * | 8/2003  | Tajiri ......................... 369/244 |
| 2004/0240335 | A1 | * | 12/2004 | Cho et al. ............... 369/44.15 |
| 2005/0078570 | A1 | * | 4/2005  | Kabasawa ............... 369/44.15 |
| 2005/0117469 | A1 | * | 6/2005  | Song et al. .............. 369/44.15 |

FOREIGN PATENT DOCUMENTS

| JP | 5-266507    | 10/1993 |
| JP | 2000-195078 | 7/2000  |

OTHER PUBLICATIONS

Machine translation of application No. Japan 05-266507 by Ishizuka Atsushi on Oct. 15, 1993.*
Office Action issued Nov. 10, 2006 by the Korean Intellectual Property Office re: Korean Patent Application No. 2005-107004.

* cited by examiner

*Primary Examiner*—Wayne R Young
*Assistant Examiner*—Linh T Nguyen
(74) *Attorney, Agent, or Firm*—Stanzione & Kim, LLP

(57) ABSTRACT

An optical pickup including a moving unit including a lens holder on which an objective lens is positioned, a set of suspension wires to movably support the lens holder on a base of the optical pickup actuator, each suspension wire having one end fixed to a side of the lens holder, and the other end fixed to connection portions positioned at opposite sides of a tilt spring, the tilt spring including a middle portion, between the connection portions, to be connected to a holder positioned on the base, and bridge portions to connect the middle portion to each of the connection portions, the bridge portions flexibly deforming when the moving unit is driven, and a magnetic circuit installed at the lens holder and the base to drive the moving unit.

19 Claims, 7 Drawing Sheets

OPTICAL PICKUP ACTUATOR

CROSS-REFERENCE TO RELATED PATENT APPLICATION

This application claims the benefit of Korean Application No. 2005-107004, filed Nov. 9, 2005 in the Korean Intellectual Property Office, the disclosure of which is incorporated herein in its entirety by reference.

BACKGROUND OF THE INVENTION

1. Field of the Invention

An aspect of the present invention relates to an optical pickup actuator, and, more particularly, to a quadaxial driving optical pickup actuator, which is capable of tilt driving in a tangential direction.

2. Description of the Related Art

An optical pickup is a core element of optical memory systems such as optical recording and/or reproducing apparatuses, and requires an actuator which drives an objective lens. The actuator generally has a moving coil that intersects a magnetic field of a permanent magnet and performs motion with one-degree-of-freedom (a translational motion) to accurately move an objective lens to a desired position.

However, while an optical recording and/or reproducing apparatus records and/or reads information on and/or from a disc, if the disc is bent or flexed, an optical signal generated from the disc is degraded. In general, the degradation of an optical signal caused by a tilt of a disc is compensated by measuring the tilt of the disc by a tilt sensor with respect to an optical pickup and tilting an objective lens by an actuator that is capable of tilt driving to correct the tilt of the objective lens relative to the disc.

Figure 1:
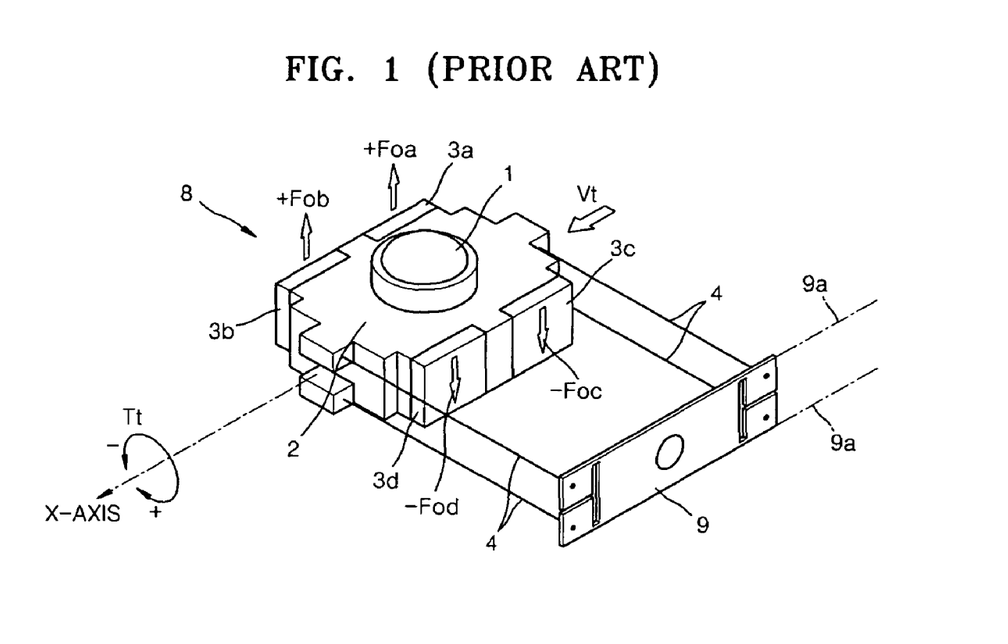
FIG. 1 is a schematic view of a conventional actuator disclosed in Japanese published patent application no. 2000-195078.

Japanese Published Patent Application No. 2000-195078 disclosed an actuator capable of tilt driving in three axial directions in order to compensate for the degradation of an optical signal by the tilt of a disc. FIG. 1 is a schematic view of an optical pickup actuator disclosed in Japanese Published Patent Application No. 2000-195078 and a partial perspective view of a moving unit 8, a tilt spring 9 and a suspension wire 4 thereof.

The moving unit 8 includes a lens holder 2 supporting an objective lens 1, and permanent magnets 3a, 3b, 3c and 3d. The objective lens 1 and the permanent magnets 3a, 3b, 3c and 3d are fixed to the lens holder 2.

One end of the suspension wire 4 is fixed to the moving unit 8, and the other end thereof is fixed to the tilt spring 9. The tilt spring 9 is combined with a suspension holder (not shown). According to FIG. 1, reference numeral 9a denotes a central transformation axis which the tilt spring 9 is deformed around, −Foa, −Foc, +Fob and +Fod are the driving forces obtained when an electrical current is applied to a focusing coil (not shown).

Figure 2A:
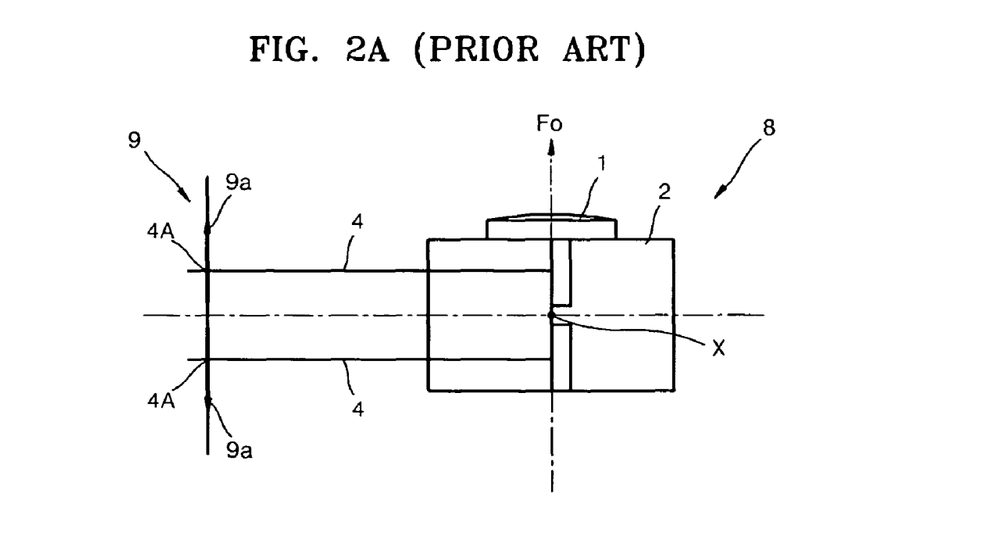
FIGS. 2A through 2C are front views of a moving unit from the direction of arrow Vt of FIG. 1, with FIG. 2A illustrating a state (initial state) when driving forces do not act on the moving unit, and FIGS. 2B and 2C illustrating a tangential tilt (Tt) state.
Figure 2B:
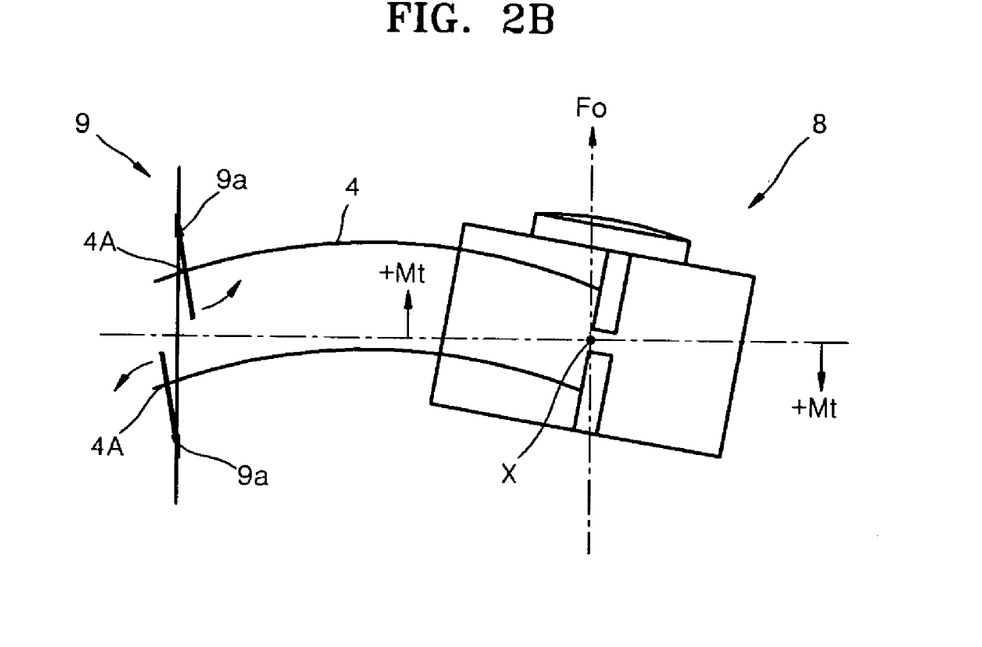
Figure 2C:
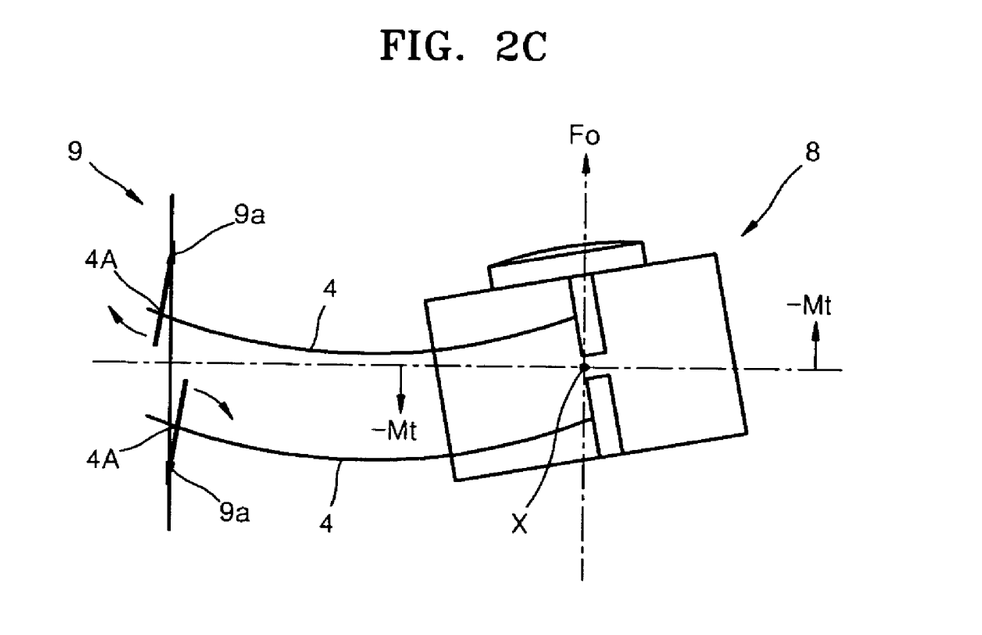

FIGS. 2A through 2C are front views of the moving unit 8 from the direction of arrow Vt of FIG. 1. FIG. 2A illustrates a state (initial state) when the driving forces do not act on the moving unit, and FIGS. 2B and 2C illustrate respective tangential tilt states of the moving unit 8. In FIGS. 2B and 2C, ±Mt is an axially rotational moment in the tangential tilt direction acting on the moving unit 8. The resultant force of the driving forces −Foa, −Foc, +Fob and +Fod acts on the moving unit 8 as the moment +Mt or −Mt of the x-axial rotational force.

As shown in FIGS. 2B and 2C, the suspension wire 4 may be in a tensile or compressive state according to the moment of a force, and the tilt spring 9 is deformed around a central transformation axis 9a thereof, such that a fixed supporter 4a of the suspension wire 4 is displaced in a tensile or compressive direction. As a result, the moving unit 8 is movably supported in the tangential tilt direction, in proportion to an amount of a displacement of the fixed supporter 4a.

In the conventional actuator described above, the tilt spring 9 is disposed to support the fixed supporter 4a of the suspension wire 4 so as to be displaced in the tensile or compressive direction, thereby driving the moving unit 8 in quadaxial directions (i.e., not only a in a focusing direction, a tracking direction, and a radial direction but also in a tangential tilt direction relative to the base of the actuator and to an information storage medium being acted upon).

Since the conventional actuator includes the tilt spring 9 being connected to the suspension holder and flexibly deforming a plate to which the suspension wire is fixed, the moving unit including the objective lens is movable in the tangential tilt direction in addition to the radial tilt direction. That is, in the conventional actuator, the quadaxial driving in the radial tilt direction and the tangential tilt direction (in addition to the focusing direction and the tracking direction) is possible by relatively greatly reducing the torsion coefficient in the radial direction and the torsion coefficient in the tangential direction, based on a method of deforming the plate as a fixed requirement. Also, an electromagnetic circuit capable of the quadaxial driving is constituted in a moving magnet structure as shown in FIG. 1. Thus, a wiring configuration may be relatively easily realized.

However, since the conventional tilt actuator causes Y-translation along a Y-axis, or yawing-related sub-resonance on the focusing or tracking characteristics, actuator performance may deteriorate relatively seriously. Here, the Y-axis is defined as a direction that is perpendicular to the X-axis shown in FIG. 1. The Y-translation is a translational mode in an unnecessary direction, i.e., in the direction perpendicular to the focusing driving direction and the tracking driving direction, in addition to the required translational motion in the focusing direction and the tracking direction.

Consequently, the conventional tilt actuator does not satisfy the condition that any unnecessary motions must not occur, except for the four motions of focusing, tracking, radial tilt and tangent tilt, by maximally decreasing the natural frequency related to a pitching mode which is a relevant vibration mode enabling the tangential tilt motion, and maximally increasing the natural frequency in the Y-translation or yawing mode.

SUMMARY OF THE INVENTION

An aspect of the present invention provides an optical pickup actuator which has an improved structure that maximally decreases the natural frequency relating to a pitching mode, which is a vibration mode enabling the tangential tilt motion, and maximally increases the natural frequency relating to an unnecessary Y-translational mode or a yawing mode, so as to enable only four motions of focusing, tracking, radial tilt and tangential tilt, and so as to prevent other unnecessary motion from occurring.

According to an aspect of the present invention an optical pickup actuator comprising: a moving unit including a lens holder on which an objective lens is positioned; a set of suspension wires to movably support the lens holder on a base of the optical pickup actuator, each suspension wire having one end fixed to a side of the lens holder, and the other end fixed to connection portions positioned at opposite sides of a tilt spring, the tilt spring including a middle portion, between the connection portions, to be connected to a holder positioned on the base, and bridge portions to connect the middle portion to each of the connection portions, the bridge portions flexibly deforming when the moving unit is driven; and a magnetic circuit installed at the lens holder and the base to drive the moving unit.

The magnetic circuit may comprise magnets and a plurality of coils, to enable quadaxial driving such as focusing, tracking, radial tilt and tangential tilt.

The actuator may be a moving coil structure which may be positioned on the moving unit.

The supporting member may be a wire and at least part thereof may be used as a path to apply a current to the coils positioned on the moving unit, and the tilt spring may be a printed circuit board on which a lead pattern electrically connected to the supporting member used as the path to apply the current to the coils positioned on the moving unit is formed.

The tilt spring may be formed to a thickness less than 0.6 mm.

The tilt spring may be formed to a thickness of about 0.1 mm.

The bridge portion may be positioned at or around a center line of a width in a focusing direction of the connection portions and the middle portion, and may be have a width less than the width in the focusing direction.

The optical pickup actuator may further comprise a fixing element locally added to the tilt spring.

The fixing element may be added around the center line of the tilt spring.

The fixing element may be thicker than the tilt spring.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
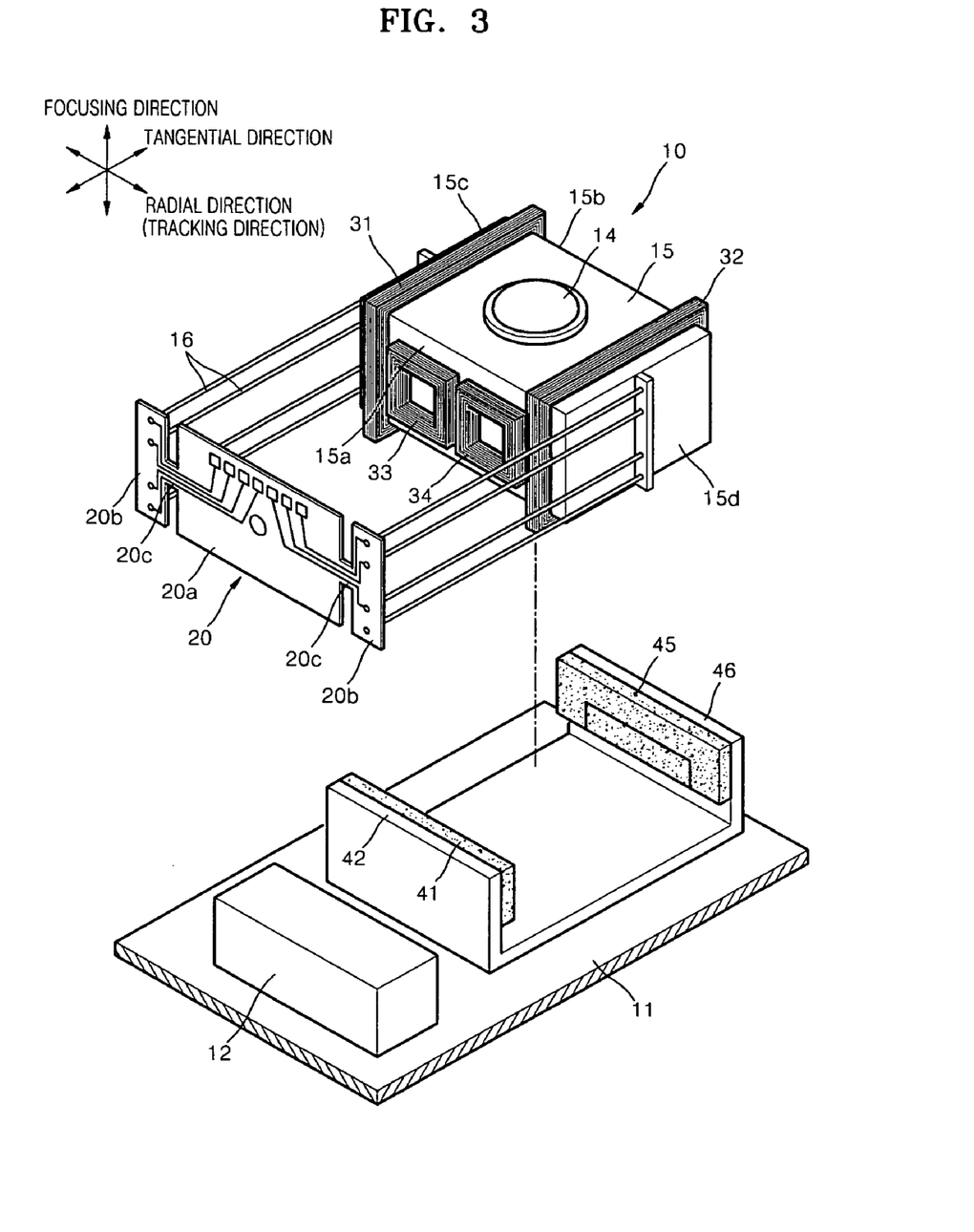
FIG. 3 is a partially exploded perspective view schematically illustrating an optical pickup actuator according to an embodiment of the present invention.
Figure 4:
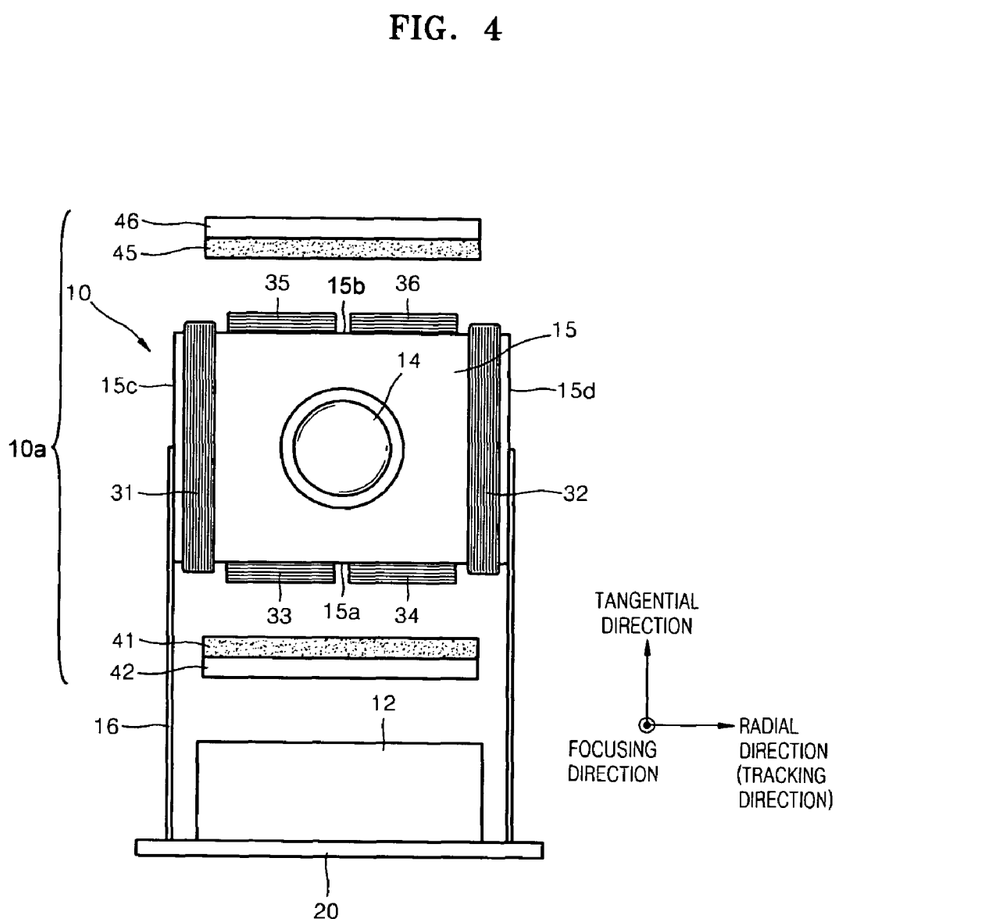
FIG. 4 is a schematic plan view of the optical pickup actuator of FIG. 3.
Figure 5:
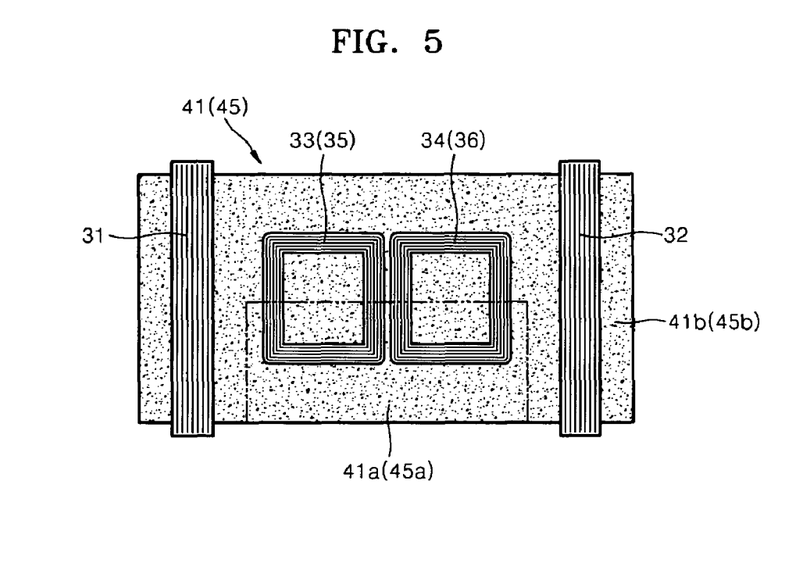
FIG. 5 is a diagram showing an arrangement relation of magnets and coils in a magnetic circuit of FIG. 3.

FIG. 3 is a partially exploded perspective view schematically illustrating an optical pickup actuator according to an embodiment of the present invention, FIG. 4 is a plan view of FIG. 3, and FIG. 5 is a diagram showing an arrangement of magnets and coils in a magnetic circuit of FIG. 3. As shown in FIGS. 3 through 5, the optical pickup actuator comprises a lens holder 15 on which an objective lens 14 is positioned; a supporting member 16, which itself comprises a set of suspension wires (or, alternatively, plate springs) with ends that are fixed to the lens holder 15, to movably support the lens holder on a base 11; a tilt spring 20 connected to a holder 12 that is positioned at one side on the base 11 and which is fixed to the other ends of each of the suspension wires of the supporting member 16; and a magnetic circuit formed on the lens holder 15 and the base 11. Each of the suspension wires of the supporting member 16 may be fixed to third and fourth sides 15c and 15d of the lens holder 15 rather than first and second sides 15a and 15b of the lens holder 15 where the magnetic circuit is formed.

FIG. 3 illustrates the optical pickup actuator having a moving coil structure, in accordance with an embodiment of the invention, in which the supporting member 16 includes, for example, eight suspension wires. In the moving coil structure, the supporting member 16, formed of the eight suspension wires, movably supports a moving unit 10 of the actuator. Further, the eight suspension wires are used as the wiring to apply a driving current to coils 31-36 of the magnetic circuit 10a (see FIG. 4) formed in the moving unit 10.

In detail, as shown in FIG. 4, it is noted that the magnetic circuit 10a comprises first and second track coils 31 and 32 to drive the lens holder 15 in the tracking direction, first, second, third and fourth focus and/or tilt coils 33, 34, 35 and 36 to drive the lens holder 15 in the focusing and/or tilt direction, a first magnet 41 positioned to face the first and second focus and/or tilt coils 33 and 34 as well as first ends of the first and second track coils 31 and 32, and a second magnet 45 positioned to face the third and fourth focus and/or tilt coils 35 and 36 as well as second ends of the first and second track coils 31 and 32. First and second outside yokes 42 and 46, positioned on respective outer surfaces of the first and second magnets 41 and 45, to fix the first and second magnets 41 and 45, respectively, guide the magnetic flux generated in the first and second magnets 41 and 45.

The first and second track coils 31 and 32 are wound around the lens holder 15 and are respectively positioned at both sides of the objective lens 14 in the radial direction of an information storage medium for which the optical pickup actuator is designed. First and second sides 15a and 15b of the lens holder 15 and the respective first and second ends of the first and second track coils 31 and 32 face the first and second magnets 41 and 45, and these facing portions are used as effective track coils.

The first and second focus and/or tilt coils 33 and 34 are arranged collinearly in the radial direction of the information storage medium for which the optical pickup actuator is designed and are supported on the first side 15a of the lens holder 15, and the third and fourth focus and/or tilt coils 35 and 36 are arranged in the radial direction of the information storage medium for which the optical pickup actuator is designed and are supported on the second side 15b of the lens holder 15.

The first and second magnets 41 and 45 include first magnet regions 41a and 45a (see FIG. 5) and second magnet regions 41b and 45b (see FIG. 5). The second magnet regions 41b and 45b surround three sides of the first magnet regions 41a and 45a. the respective sides of the first magnet regions 41a and 45a that are not surrounded each extend perpendicularly with respect to the focusing direction of the information storage medium for which the optical pickup actuator is designed. The second magnet regions 41b and 45b have a polarity that is opposite to the polarity of the first magnetic regions 41a and 45a.

As shown in FIG. 5, the first and second focus and/or tilt coils 33 and 34 are arranged in the radial direction of the information storage medium for which the optical pickup actuator is designed, so that their respective upper and lower portions are arranged to respectively face the second and first magnet regions 41b and 41a of the first magnet 41. A driving current flowing in the first and second focus and/or tilt coils 33 and 34 interacts with the magnetic flux generated by the first and second magnet regions 41a and 41b and generates a driving force in the focusing direction of the information storage medium for which the optical pickup actuator is designed. The third and fourth focus and/or tilt coils 35 and 36 are similarly arranged in the radial direction of the information storage medium for which the optical pickup actuator is designed, so that their respective upper and lower portions are arranged to respectively face the second and first magnet regions 45b and 45a of the second magnet 45. A driving current flowing into the third and fourth focus and/or tilt coils 35 and 36 interacts with the magnetic flux generated by the first and second magnet regions 45a and 45b and generates a driving force in the focusing direction of the information storage medium for which the optical pickup actuator is designed. The driving currents are independently applied to the first, second, third and fourth focus and/or tilt coils 33, 34, 35 and 36, respectively, thereby independently generating the driving forces in the focusing direction. When the current applied to each of the first, second, third and fourth focus and/or tilt coils 33, 34, 35 and 36 is controlled, the focus, radial tilt and tangential tilt of the moving unit 10 may be controlled.

The first and second track coils 31 and 32 are arranged so that their effective coil portions face only the second magnet regions 41b and 45b of the first and second magnets 41 and 45.

A common terminal application coil structure may be applied to the magnetic circuit, which is a moving coil type of magnetic circuit, such that the magnetic circuit includes a total of seven wires including five wires used to form the first, second, third and fourth focus and/or tilt coils 33, 34, 35 and 36 for the focusing and/or tilting with a common terminal plus two wires for the first and second track coils 31 and 32. In this case, the supporting member 16, i.e., the suspension wires, to support the moving unit 10 may be formed of eight suspension wires including one dummy wire, to meet the above requirements for coil wiring. Of the seven wires used for the current path, four wires are connected to the first, second, third and fourth focus and/or tilt coils 33, 34, 35 and 36, respectively, two wires are connected to the first and second track coils 31 and 32, and one wire is connected to a common terminal. The magnetic circuit, thus, enables quadaxial driving in the focusing direction, tracking direction, radial tilt direction and tangential tilt direction.

The magnetic circuit applied to the optical pickup actuator according to the current embodiment of the present invention is not limited to the structure shown in FIGS. 3 through 5, but may have any structure which enables quadaxial driving known in the art.

Since an end of each of the suspension wires of the supporting member 16 is fixed to the tilt spring 20, the tilt spring 20 is formed to be flexibly deformed when the moving unit 10 is driven to perform a motion not only in the radial tilt direction but also in the tangential tilt direction. Specifically, the tilt spring 20 is formed to maximally prevent any other unnecessary motion (i.e., Y-translation and yawing mode in the tangential direction) and has a sufficiently low torsion coefficient in the radial direction and in the tangential direction for the quadaxial driving.

Figure 6:
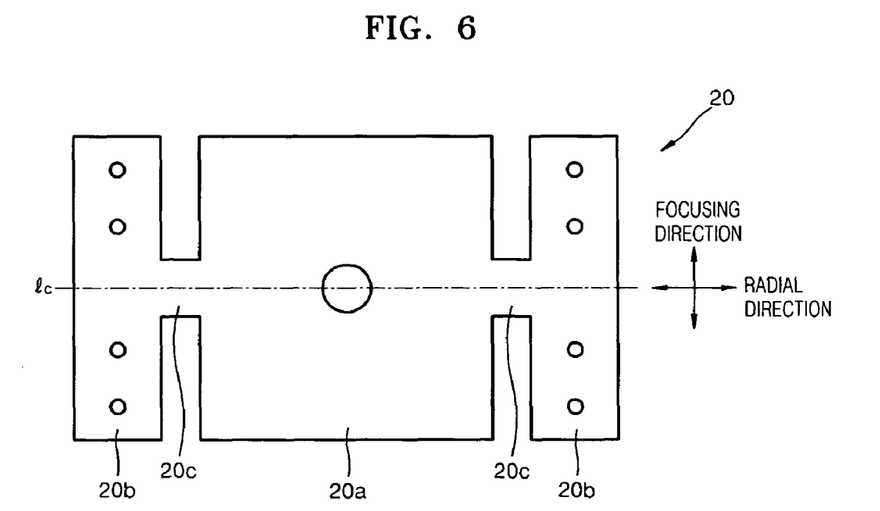
FIG. 6 is a plan view of the tilt spring of FIG. 3.

FIG. 6 illustrates the shape of the tilt spring 20. The tilt spring 20 of FIG. 6 is relatively very thin. As shown in FIG. 6, the tilt spring 20 includes a middle portion 20a connected to the holder 12, connection portions 20b positioned at opposite sides in the radial direction of the middle portion 20a, which fix the corresponding ends the suspensions wires of the supporting member 16, and bridge portions 20c to connect the middle portion 20a to the respective connection portions 20b. The bridge portion 20c is positioned on or around a center line of the width in the focusing direction of the tilt spring 20, and is formed so as to have a width that is less than the width of the connection portions 20b in the focusing direction. That is, open regions exist above and below the bridge portions 20c in the focusing direction. The tilt spring 20 of the above-described shape may be formed by removing upper and lower portions of the tilt spring 20 between the middle portion 20a and the connection portions 20b.

The tilt spring 20 having the above-describe structure is capable of maximally decreasing the natural frequency of the optical pickup actuator relating to a pitch mode and maximally increasing the natural frequency of the optical pickup actuator relating to the Y-translation or yawing-mode which is an unnecessary translation mode, as known from the results of a mode analysis simulation to be described below. As a result, the tilt spring 20 has a sufficiently low torsion coefficient in the radial direction and in the tangential direction. As such, a smooth tilting motion of the objective lens is enabled to prevent unnecessary motion and to prevent degradation of an optical signal.

When the optical pickup actuator has the moving coil structure in which the coils are positioned on the moving unit 10, as shown in FIG. 3, the tilt spring 20 may be a printed circuit board with a lead pattern which applies the driving current to the moving unit 10.

Since a general printed circuit board (PCB) has a thickness of, for example, about 0.6 mm and a characteristic stiffness that may be excessively high, a desired vibration mode cannot normally be obtained. Thus, when a PCB is used as the tilt spring 20, the PCB may be significantly thinner than a general PCB. That is, the tilt spring 20, according to aspects of the present invention, may have a thickness that is less than 0.6 mm, for example, about 0.1 mm. As such, a desired vibration mode is obtainable.

Figure 7:
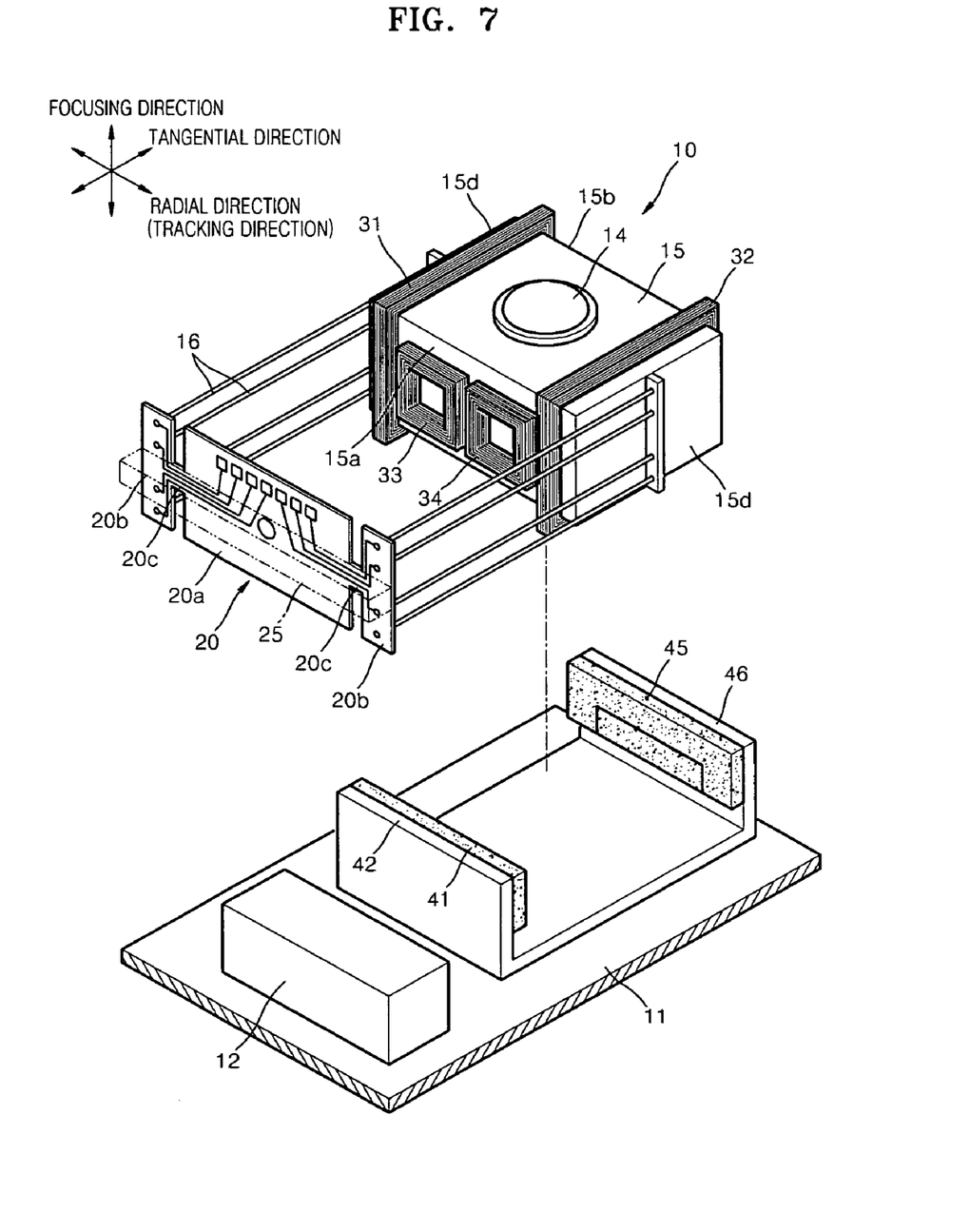
FIG. 7 is a partially exploded perspective view schematically illustrating an optical pickup actuator according to another embodiment of the present invention.

FIG. 7 is a partially exploded perspective view schematically illustrating an optical pickup actuator according to another embodiment of the present invention. The optical pickup actuator according to this embodiment of the present invention comprises a fixing element 25 that is locally added to a portion of a center line (see center line Ic of FIG. 6) of the width in the focusing direction of connection portions 20a of the tilt spring 20, as shown in FIG. 7. The fixing element 25 may be positioned to extend to the two bridge portions 20c at both sides of the middle portion 20a of the tilt spring 20. The fixing element 25 may be a separate block to be attached to the tilt spring 20 or may be a relevant portion of the tilt spring 20 formed to have a greater thickness than the other portions of the tilt spring 20.

Therefore, according to an embodiment of the invention, the fixing element 25 may be thicker than the tilt spring 20. For example, when the tilt spring 20 is 0.1 mm in thickness, the fixing element 25 may be 0.6 mm thick. As is described above, when the fixing element 25 is added to the portion of the center line Ic of the width in the focusing direction of the tilt spring 20, a yawing mode and Y-translation of the optical pickup actuator are reduced.

Results of the mode analysis simulation of the optical pickup actuator according to the embodiments of the present invention will now be described. The analysis was conducted in regard to the vibration modes, i.e., tracking, focusing, rolling, pitching, Y-translation and yawing, of the optical pickup actuator according to the embodiment of the present invention shown in FIG. 3 (referred to as an "actuator of the first present invention"). Table 1 shows the results of the analysis of the actuator of the first present invention, compared to those of the conventional optical pickup actuator of FIG. 1, which is disclosed in Japanese published patent application no. 2000-195078 (referred to as a "conventional actuator"). The results of the analysis were obtained using the same conditions, except for the difference in the shape of the tilt spring, with respect to the actuator of the first present invention and the conventional actuator. That is, in the analysis, it is assumed that the tilt spring 20 of the first present invention and the tilt spring 9 of the conventional actuator have the same thickness of 0.1 mm.

TABLE 1

| Mode | the first present invention (Hz) | Conventional (Hz) |
|---|---|---|
| focus | 26.5 | 28.9 |
| tracking | 26.9 | 23.3 |
| rolling | 49.1 | 47.9 |
| pitching | 221 | 306 |
| y-translation | 1311 | 400 |
| yawing | 1640 | 498 |

According to the results of Table 1, the actuator of the first present invention with the tilt spring 20 is capable of significantly decreasing the natural frequency relating to the pitching mode and significantly increasing the natural frequency relating to the Y-translation or yawing mode, compared to the conventional actuator.

As a result, the optical pickup actuator according to the embodiment of FIG. 3 has sufficiently low torsion coefficients in the radial and in the tangential directions, thereby preventing any other unnecessary motion from occurring while a smooth tilting motion of the objective lens is performed. Further, a degradation of an optical signal is prevented.

Another analysis was conducted in regard to the vibration modes, i.e., tracking, focusing, rolling, pitching, Y-translation and yawing, of the optical pickup actuator according to the embodiment of the present invention shown in FIG. 7 (referred to as an "actuator of the second present invention"). Table 2 shows the results of the analysis. The results of Tables 1 and 2 were obtained using substantially the same conditions for analysis, except that the actuator of the second present invention further comprises the fixing element 25, when compared with the actuator of the first present invention. In the analysis, the fixing element 25 had a thickness of 0.6 mm.

Each vibration mode of the conventional actuator in Table 2 is the same as Table 1, and is presented in Table 2 just for comparison.

TABLE 2

| Mode | the second present invention (Hz) | Conventional (Hz) |
|---|---|---|
| focus | 30.5 Hz | 28.9 |
| tracking | 32.1 | 23.3 |
| rolling | 56.3 | 47.9 |
| pitching | 325 | 306 |
| y-translation | 1850 | 400 |
| yawing | 2290 | 498 |

From Table 2, it can be seen that, since the optical pickup actuator of the second present invention additionally comprises the fixing element 25, the natural frequency of the Y-translation and yawing mode is greatly increased, compared to the optical pickup actuator of the first present invention. Consequently, the Y-translation or yawing is more reduced in the optical pickup actuator of the second present invention, compared to that of the optical pickup actuator of the first present invention.

As is described above, in accordance with aspects of the present invention, the natural frequency relating to the pitching mode, which is a vibration mode enabling the tangential tilt motion, is maximally decreased, and the natural frequency relating to the unnecessary translational mode and yawing mode is maximally increased, thereby realizing the optical pickup actuator capable of the quadaxial driving, which enables only the four motions of focusing, tracking, radial tilt and tangential tilt motion and prevents other unnecessary motion.

Figure 8:
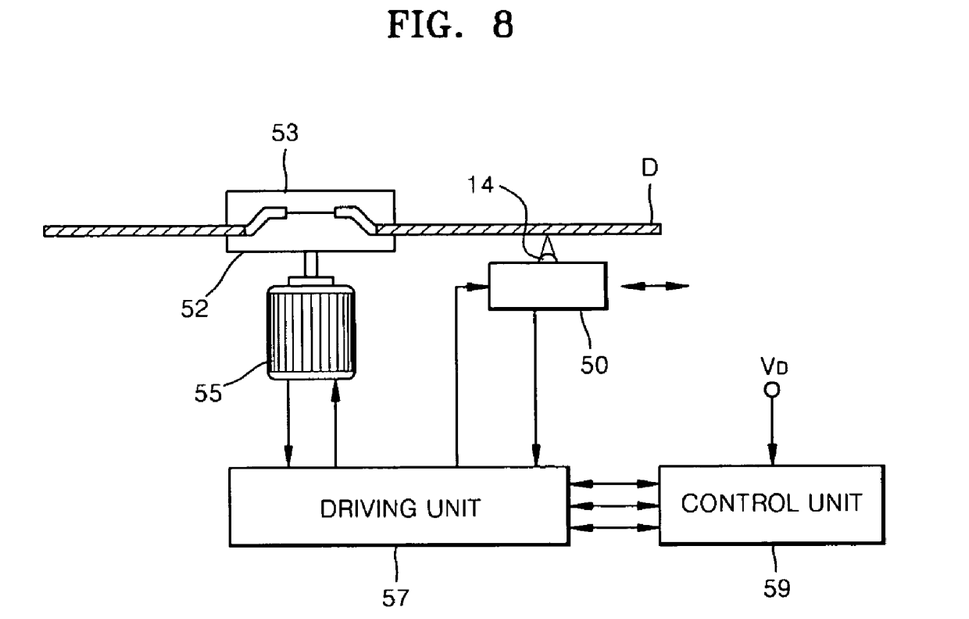
FIG. 8 is a schematic view of the structure of an optical recording and/or reproducing apparatus using the optical pickup actuator according to an embodiment of the present invention.

FIG. 8 is a schematic view of the structure of an optical recording and/or reproducing apparatus using the optical pickup actuator according to aspects of the present invention. As shown in FIG. 8, the optical recording and/or reproducing apparatus comprises a spindle motor 55 to rotate an optical information-storing medium, i.e., an optical disc D; an optical pickup 50 movably installed in a radial direction of the optical disc D and reproducing and/or recording information from and/or onto the optical disc D; a driving unit 57 to drive the spindle motor 55 and the optical pickup 50; and a control unit 59 to control focusing, tracking and/or tilt servos of the optical pickup 50. Reference numbers 52 and 53 denote a turntable and a clamp, to chuck the optical disc D, respectively.

The optical pickup 50 comprises an optical pickup optical system with an objective lens 14 to focus the light from a light source on the optical disc D, and an optical pickup actuator that is capable of quadaxial driving, to drive the objective lens 14. The optical pickup actuator is an optical pickup actuator according to one of the embodiments of the present invention. That is, the optical pickup actuator of the optical recording and/or reproducing apparatus may be the optical pickup actuator according to the embodiments of the present invention shown in FIG. 3 or FIG. 7. As such, the optical pickup actuator may include the tilt spring 20 of the present invention, or it may include the actuator for the quadaxial driving, with the fixing element 25 additionally included in the tilt spring 20.

The light reflected from the optical disc D is detected through an optical detector positioned at the optical pickup 50, and is photoelectrically converted into an electrical signal. The electrical signal is input to the control unit 59 through the driving unit 57. The driving unit 57 controls the rotation speed of the spindle motor 55, amplifies the input signal and drives the optical pickup 50. The control unit 59 controls the focusing, tracking, radial tilt and tangential tilt servos based on the signals input from the driving unit 57, and sends commands to control the servos to the driving unit 57, to realize the focusing, tracking, radial tilt and tangential tilt operations of the optical pickup 50.

Generally, the optical recording and/or reproducing apparatus further comprises a tilt sensor (not shown) to detect a tilt of the optical disc D when the optical disc D is bent or flexed while the optical recording and/or reproducing apparatus records and/or reads information onto and/or from the optical disc D. The tilt sensor is positioned on, for example, the reference plane of the optical pickup 50 or the cover surface (not shown) of the actuator, to measure a quantity of the tilt of the optical disc D having the frequency characteristic due to when the optical disc D rotates. The optical recording and/or reproducing apparatus may further comprise another tilt sensor in a side of the moving unit 10, to measure a quantity of the tilt of the objective lens 14 having the frequency characteristic. Signals of the quantities of the tilt of the optical disc D and the tilt of the objective lens 14, which are measured by the tilt sensors, are used as input signals to be applied to the tilt coils of the actuator through a differential amplifier, i.e., the first through fourth focus and/or tilt coils of FIGS. 3 through 7. When a current is applied to the first through fourth focus and/or tilt coils, an electromagnetic force, i.e., a moment, is generated to tilt the lens holder by the interaction between the current and the magnets generating the magnetic flux in the direction perpendicular to the direction in which the current flowing to the coils. The moment generated by the tilt coils acts in the direction of relatively reducing the quantities of the tilt of the optical disc D and the objective lens 14.

As is described above, the optical pickup actuator according to the embodiments of the present invention has a tilt spring that is structured to maximally decrease the natural frequency of the tilt spring to enable tangential tilt motion thereof and to maximally increase the natural frequency of the tilt spring relating to the unnecessary translational mode (Y-translation) and the yawing mode. The optical pickup actuator that is capable of quadaxial driving is, therefore, realized, to enable only the four motions of focusing, tracking, radial tilt and tangential tilt directions and to prevent other unnecessary motion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator comprising:
a moving unit including a lens holder on which an objective lens is positioned;
a set of suspension wires to movably support the lens holder on a base of the optical pickup actuator, each suspension wire having one end fixed to a side of the lens holder, and the other end fixed to connection portions positioned at opposite sides of a tilt spring, the tilt spring including a middle portion, between the connection portions, to be connected to a holder positioned on the base, and bridge portions to connect the middle portion to each of the connection portions, the bridge portions flexibly deforming when the moving unit is driven; and
a magnetic circuit installed at the lens holder and the base to drive the moving unit, wherein the magnetic circuit comprises a set of magnets and a plurality of coils to enable quadaxial driving in focusing, tracking, radial tilt, and tangential tilt directions, and wherein a subset of the set of suspension wires is used to apply current to the plurality of coils, and wherein the tilt spring comprises a printed circuit board on which a lead pattern electrically connected to the subset of the set of suspension wires that is used to apply the current to the coils is formed, and wherein a thickness of the tilt spring is less than 0.6 mm.

2. The optical pickup actuator according to claim 1, wherein the actuator comprises a moving coil structure which is positioned on the moving unit.

3. The optical pickup actuator according to claim 1, wherein a thickness of the tilt spring is approximately 0.1 mm.

4. The optical pickup actuator according to claim 1, wherein the bridge portions are positioned at or around a center line of the width of the connection portions and the middle portion of the tilt spring.

5. The optical pickup actuator according to claim 4, wherein a width of each of the bridge portions is less than a width of each of the connection portions.

6. The optical pickup actuator according to claim 4, further comprising a fixing element added to the tilt spring to extend between the bridge portions of the tilt spring.

7. The optical pickup actuator according to claim 6, wherein the fixing element is added on or near to the center line of the tilt spring.

8. The optical pickup actuator of claim 6, wherein a thickness of the fixing element is larger than that of the tilt spring.

9. An optical pickup actuator comprising:
a base, including a holder at a first end thereof and a yoke structure at a second end thereof supporting magnetic units facing each other;
a moving unit including coils to interact with the magnetic units upon independent applications of current thereto to quadaxially drive the moving unit relative to the base; and
a suspension system to suspend the moving unit between the magnetic units, the suspension system comprising:
a tilt spring connected to the holder, on which a circuit board is printed, having a middle portion, connection portions at opposite sides of the middle portion, and bridge portions thinner than the connection portions to couple the connection portions to the middle portion; and
a set of suspension wires to couple the connection portions to the moving unit and to electrically couple the circuit board to each of the coils,
wherein a thickness of the tilt spring is less than 0.6 mm.

10. The optical pickup actuator according to claim 9, wherein the yoke structure is u-shaped and comprises:
a bottom portion integrally connected to the base; and
members extending vertically relative to the base from the bottom portion.

11. The optical pickup actuator according to claim 10, wherein the magnetic units are supported on interior sides of the vertically extending members to face each other.

12. The optical pickup actuator according to claim 11, wherein the magnetic units each comprise first and second magnets to generate first and second magnet regions, respectively, the first magnet region surrounding the second magnet region.

13. The optical pickup actuator according to claim 9, wherein the circuit board comprises a lead structure to supply current to each of the coils independently.

14. The optical pickup actuator according to claim 9, wherein the quadaxial driving of the moving unit comprises driving the moving unit in focusing, tracking, radial tilt, and tangential tilt directions relative to the base.

15. The optical pickup actuator according to claim 9, wherein a thickness of the tilt spring is approximately 0.1 mm.

16. The optical pickup actuator according to claim 9, wherein the middle portion and the connection portions have substantially similar widths.

17. The optical pickup actuator according to claim 9, further comprising a fixing unit integrally connected to the tilt spring along a center line thereof, the fixing unit being thicker than the tilt spring.

18. A recording and/or reproducing apparatus to record and/or reproduce information onto and/or from a recording surface of an information storing medium comprising an optical pickup including the optical pickup actuator of claim 9 in which an objective lens, which focuses a light beam from a light source in the optical pickup onto the recording surface, is supported by the moving unit.

19. The apparatus according to claim 18, comprising:
 a driving unit to drive a spindle motor to spin the information storage medium and to drive the optical pickup; and
 a control unit to control focusing, tracking and/or tilt servos of the optical pickup.

\* \* \* \* \*